A. G. SNYDER.
COMPUTING AND REGISTERING MECHANISM.
APPLICATION FILED MAY 28, 1910.

1,118,376.

Patented Nov. 24, 1914.
6 SHEETS—SHEET 2.

WITNESSES:

INVENTOR

BY

Attorneys

A. G. SNYDER.
COMPUTING AND REGISTERING MECHANISM.
APPLICATION FILED MAY 28, 1910.

1,118,376.

Patented Nov. 24, 1914.
6 SHEETS—SHEET 4.

WITNESSES

INVENTOR
Augustus G. Snyder
BY
Attorneys

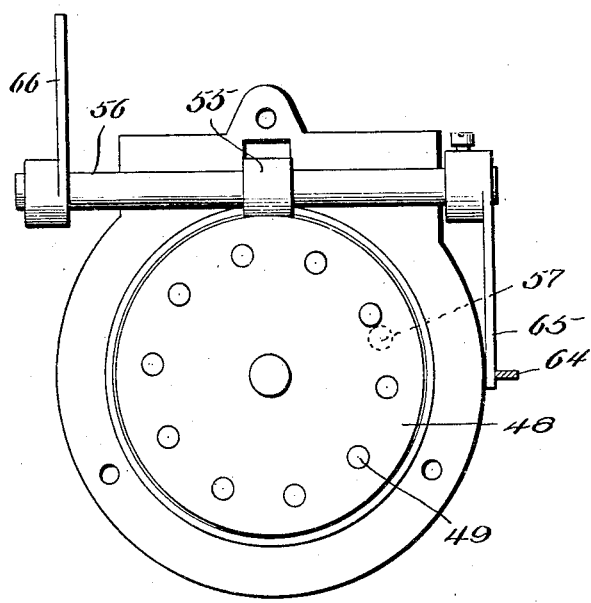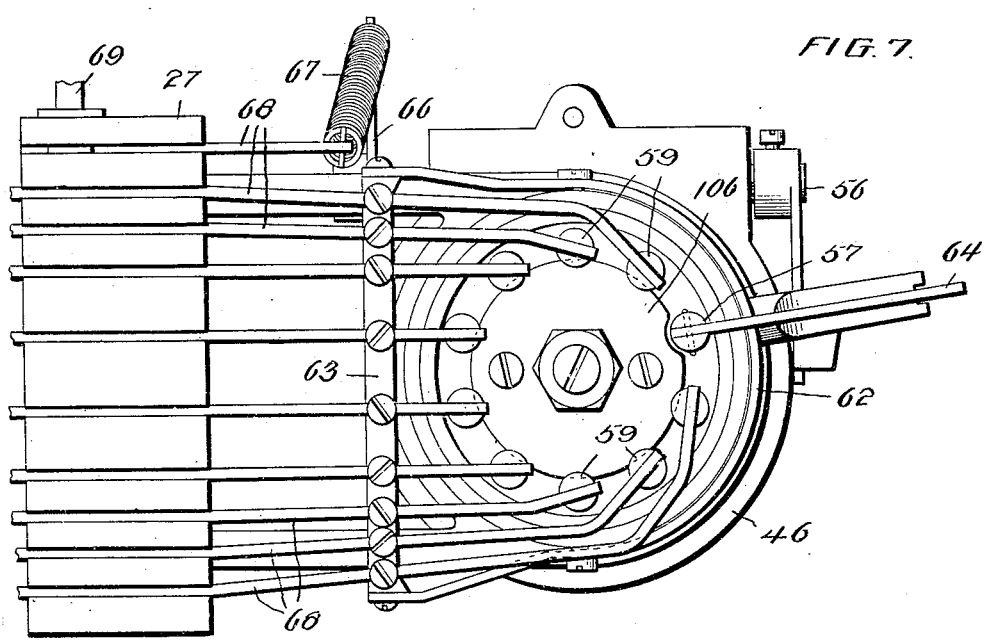

A. G. SNYDER.
COMPUTING AND REGISTERING MECHANISM.
APPLICATION FILED MAY 28, 1910.
1,118,376.
Patented Nov. 24, 1914.
6 SHEETS—SHEET 6.
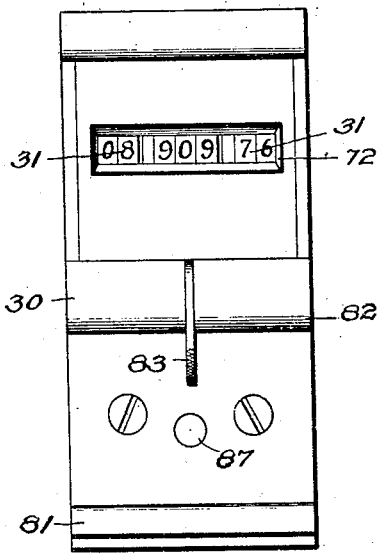
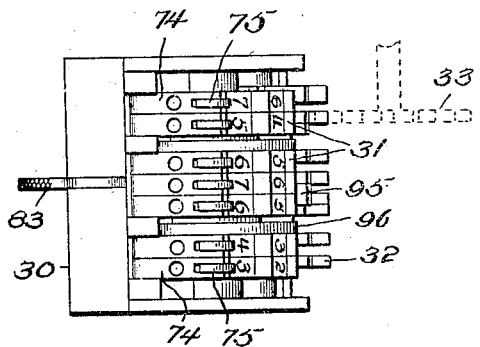
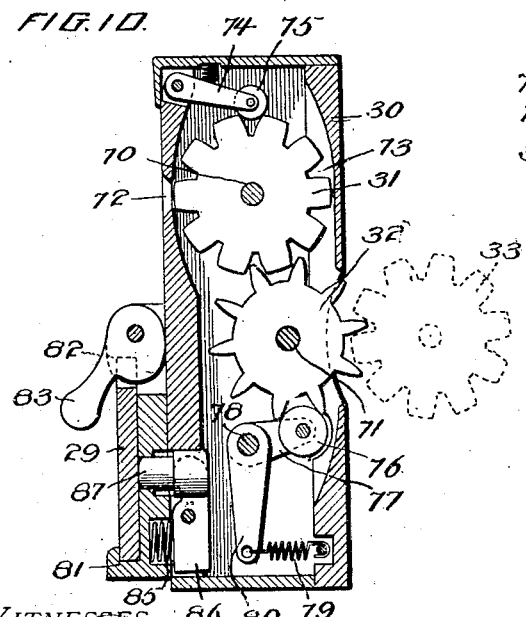

UNITED STATES PATENT OFFICE.

AUGUSTUS G. SNYDER, OF UTICA, NEW YORK, ASSIGNOR, BY MESNE ASSIGNMENTS, TO GEORGE H. SPITZLI, OF UTICA, NEW YORK.

COMPUTING AND REGISTERING MECHANISM.

1,118,376.  Specification of Letters Patent.  Patented Nov. 24, 1914.

Application filed May 28, 1910. Serial No. 564,300.

*To all whom it may concern:*

Be it known that I, AUGUSTUS G. SNYDER, a citizen of the United States, residing at Utica, in the county of Oneida and State of New York, have invented or discovered certain new and useful Improvements in Computing and Registering Mechanism, of which the following is a specification, reference being had therein to the accompanying drawings.

This invention relates to computing machines, and has for its general objects to provide a machine of this character which is relatively simple and inexpensive of construction and at the same time easy and convenient of manipulation, and accurate and reliable in its operation.

As to certain features of the escapement mechanism hereinafter described and some parts associated therewith the invention may be considered in the nature of an improvement on the machine shown and described in Letters Patent No. 1,004,682, granted October 3, 1911, to Esther A. Burnop, administratrix of the estate of William A. Burnop, deceased, although other features thereof are believed to be broadly new.

The more particular objects of the invention, together with means whereby the same may be carried into effect, will best be understood from the following description of one form or embodiment thereof illustrated in the accompanying drawings. It will be understood, however, that the construction described and shown has been chosen for illustrative purposes merely, and that the invention may be embodied in many other forms without departing from the spirit and scope thereof.

Figure 1:
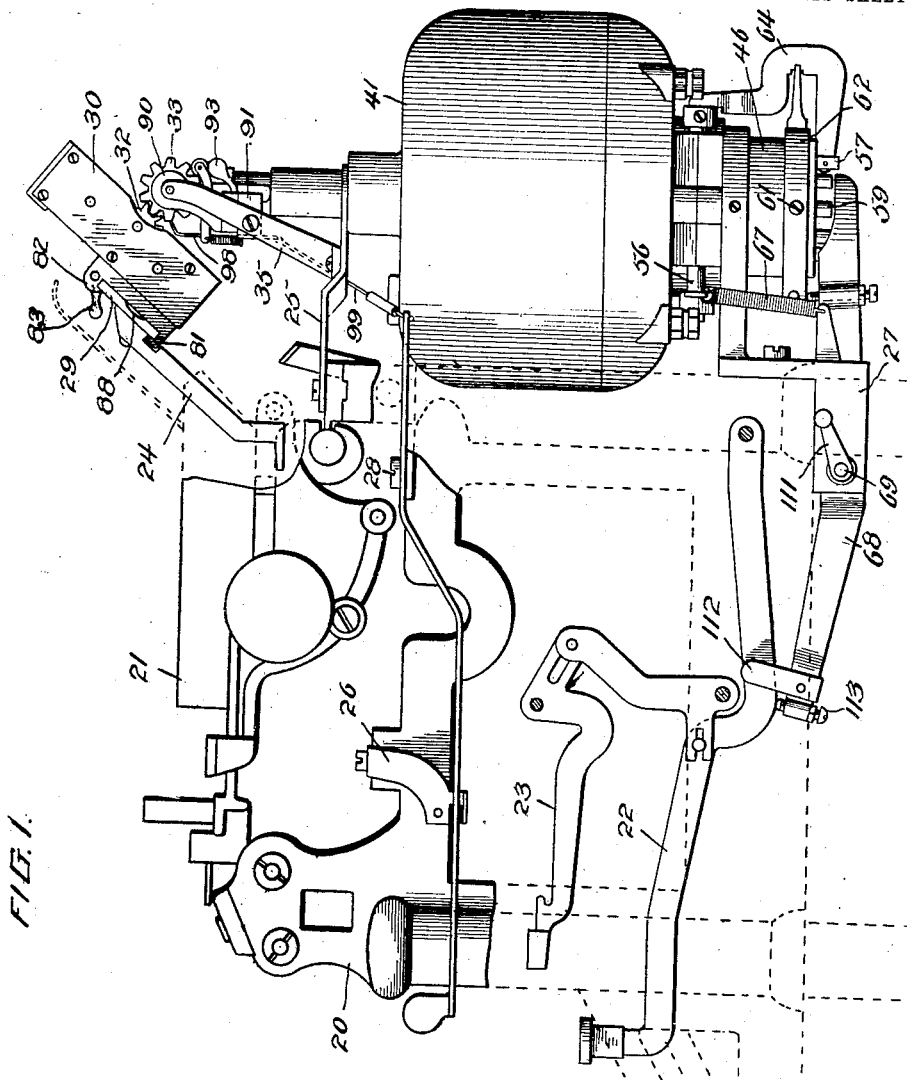
Figure 2:
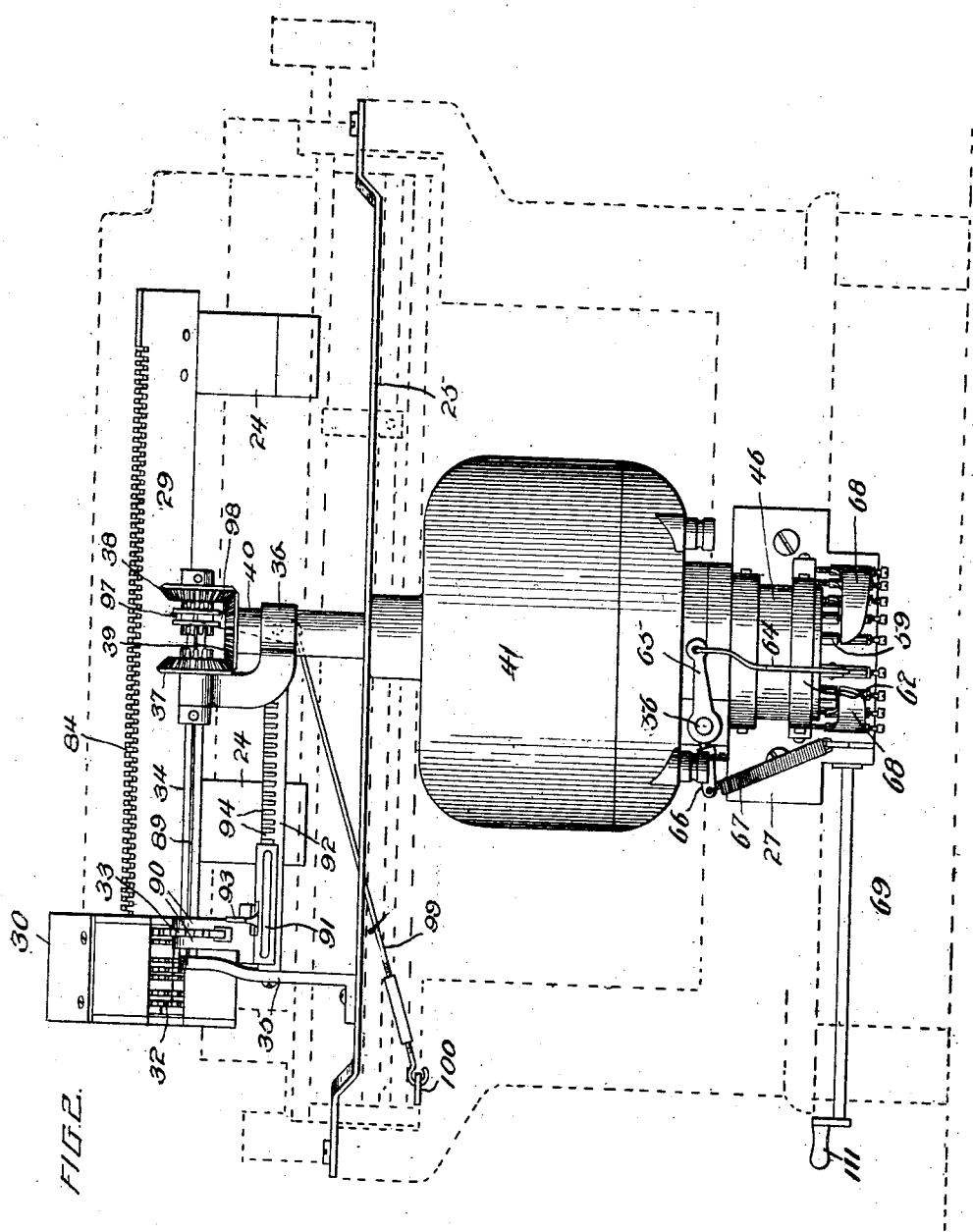
Figure 3:
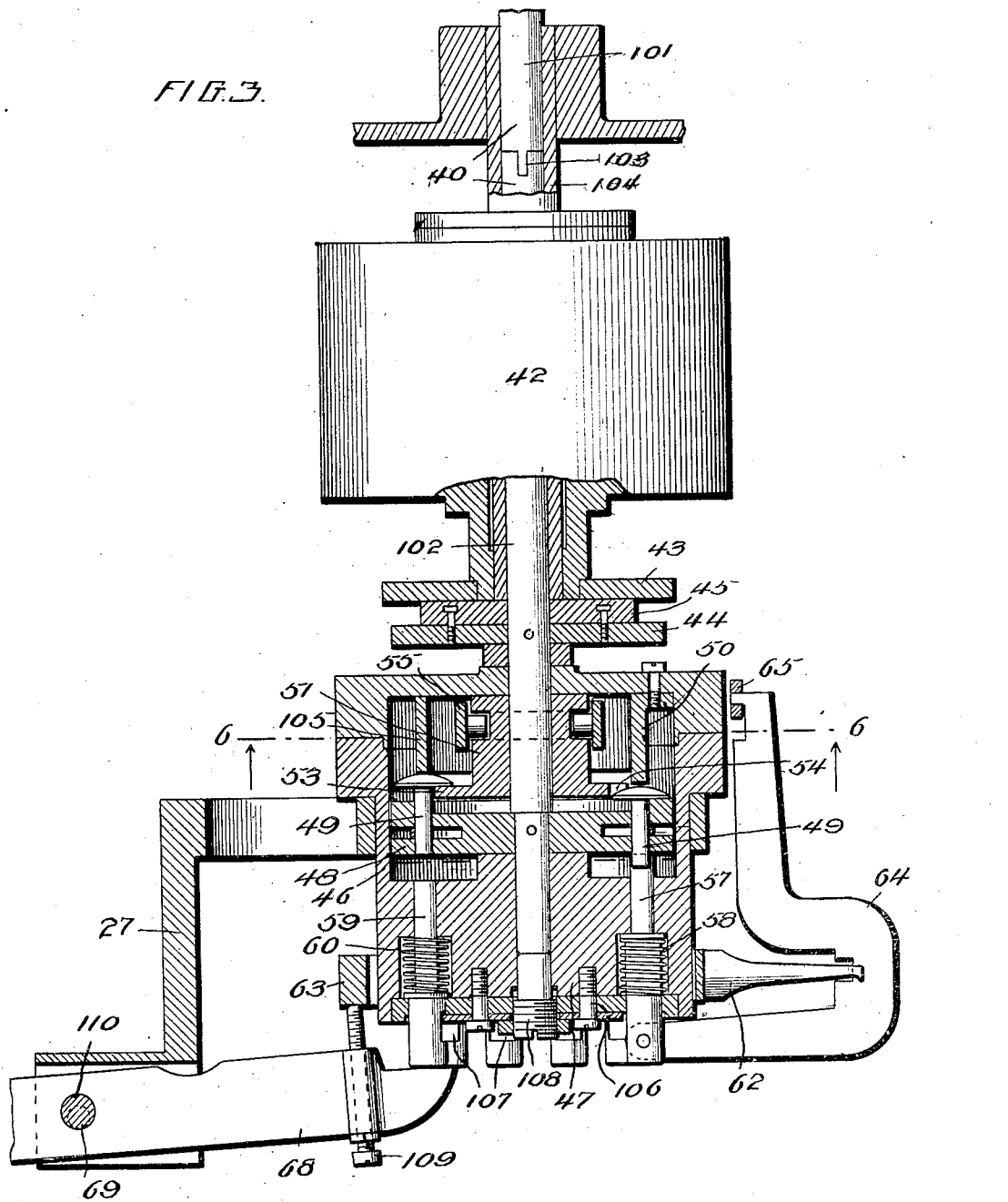
Figure 4:
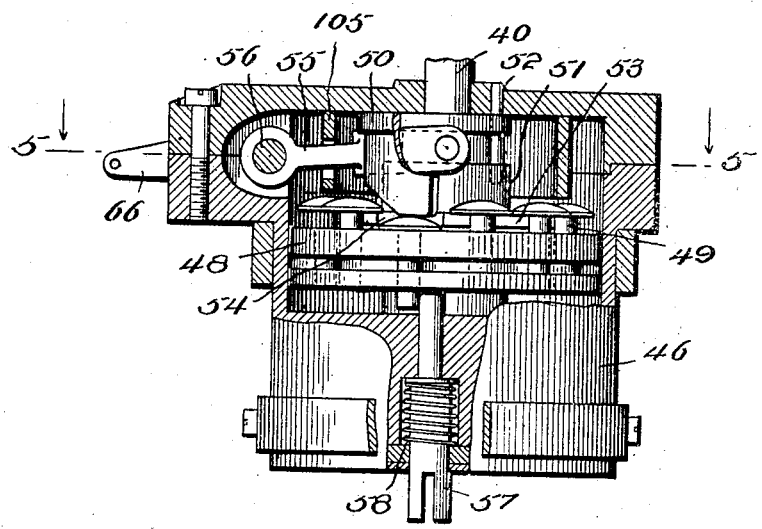
Figure 5:
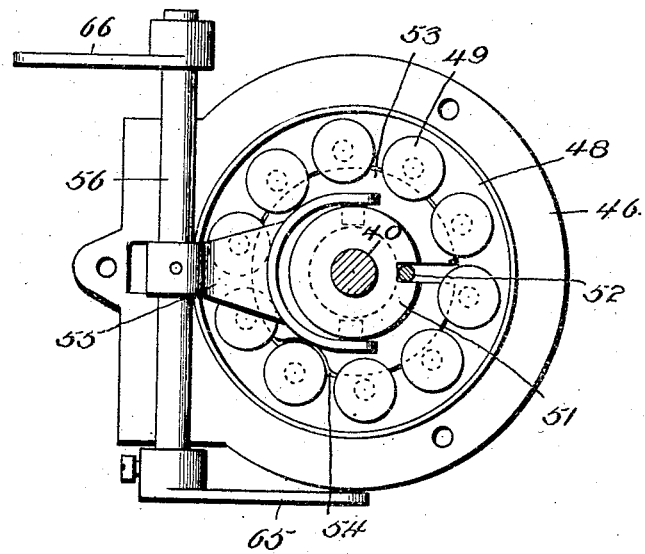

In said drawings Figure 1 is a side elevaton of a typewriter having my invention applied thereto, parts of the frame being broken away; Fig. 2 is a rear elevation thereof, the usual parts of the typewriter being shown in dotted lines; Fig. 3 is an enlarged vertical section of the escapement mechanism; Fig. 4 is an elevation, partly in section, of the escapement mechanism viewing the same substantially at right angles to Fig. 3; Fig. 5 is a section taken substantially on the line 5—5, Fig. 4; Fig. 6 is a section taken substantially on the line 6—6 Fig. 3; Fig. 7 is a bottom plan view of the arms or levers for operating the escapement; Fig. 8 is a front elevation of the totalizer; Fig. 9 is a plan view thereof with the top cover plate removed; Fig. 10 is a central vertical section of the totalizer and the bar to which it is attached; and Fig. 11 is a rear elevation of the totalizer with the rear cover plate removed.

The machine forming the subject matter of the present invention, as to certain of its features, is particularly adapted for use as an attachment for typewriting machines, being provided with means whereby the same may be readily attached to a typewriter of any standard form for operation thereby or in conjunction therewith. As will be seen, however, other features of the invention are capable of use in computing machines generally, whether associated with typewriting mechanism or not.

Referring to the drawings, 20 denotes the frame of a typewriter having a carriage 21 which is fed forward step by step by a suitable spring and escapement mechanism (not shown) at each actuation of the key levers 22 operating the type bars 23, only one of which is shown. The mechanism herein shown is attached to the typewriter by means of brackets 24 on the carriage 21 and brackets 25, 26, and 27 and pivot screw 28 secured to the frame 20.

Carried by the brackets 24 on the typewriter carriage, is a bar 29 arranged parallel to the path of movement of the carriage and on which is mounted a totalizer 30 having indicator or number wheels 31 having on their peripheries consecutive numerals from 0 to 9, observable through an opening 72 in the totalizer casing, said number wheels being each operated by a corresponding gear 32. As the carriage 21 is fed along in the usual operation of the machine, the gears 32 are, through a certain portion in each line, brought successively into engagement with a master gear 33 rotatably mounted on the frame. The lateral spacing between the gears 32, center to center, is equal to the length of the step through which the carriage 21 is moved at each operation of the machine. It therefore follows that, through a certain portion of each line, the master gear will cause the number of wheels 31 to be successively turned through a greater or less distance, depending upon the amount of rotation of said master gear wheel in engagement with the corresponding gear 32.

The registering mechanism above described is actuated by a shaft 34 on which said master gear 33 is mounted, said shaft being journaled in uprights 35 and 36, carried by the bracket 25, and connected through alternative gearing comprising the bevel gears 37, 38 and 39 with an actuating shaft 40. The shaft 40 is actuated by a preferably continuously running actuator or motor 41 applied to said shaft and supported by the brackets 25 and 27, said motor being herein shown as an electric motor having an armature or rotating member 42. The armature 42 and shaft 40 are operatively connected by clutch members 43 and 44 carried by said armature and shaft respectively, said clutch members being preferably formed as friction flanges having an interposed facing 45 of suitable friction material, such as leather. The motor 41 being continuously running and the flanges 43 and 44 being continuously in engagement, there is a constant tendency to turn the shaft 40, which is resisted by an escapement mechanism hereinafter described, so that the flanges 43 and 44 normally slip over one another. At the proper times, however, the escapement mechanism releases the shaft 40 and allows it to turn with the armature 42 an amount controlled by said escapement mechanism.

It is obvious that instead of the continuously running motor 41 other means might be employed for exerting upon the shaft 40 a force tending to turn the same. The continuously running motor having a permanent frictional connection with the actuating shaft, however, is believed to be the most reliable and practical means for accomplishing the desired result, and is considered an important feature of the present invention.

Except as hereinafter pointed out, the escapement mechanism may be substantially as shown and described in Letters Patent 1,004,682, above referred to. This mechanism will, however, be described as follows: Supported by the bracket 27 is a casing 46 in the end 47 of which the shaft 40 is journaled. Within the casing is a movable member, preferably in the form of a disk 48 fast on the shaft 40 and provided with a series of stops or pins 49 movable transversely thereof. Secured within the casing 46 adjacent the disk 48 is a fixed cam 50 so arranged that as the disk 48 is rotated the pins or stops 49 passing under said cam will be successively depressed into the position shown at the right of Fig. 3 (see also Fig. 4). For raising said pins into the position shown at the left of Fig. 3 there is provided a pin lifter 51 slidably mounted on the shaft 40 but held against rotation therewith by a pin 52 projecting from the top of the casing. The pin lifter 51 is provided with a flange 53 extended beneath heads formed on the pins 49 which flange is cut away at a point adjacent the cam 50 to form a notch 54. As will now be seen, when the pin lifter 51 is moved to the position shown in Fig. 3, all of the pins 49 will be lifted with the exception of the pin lying immediately below the cam 50. For operating the pin lifter there is provided a yoke 55 secured to a rock shaft 56 journaled in the casing 46.

Coöperating with the movable series of stops or pins 49 carried by the disk 48, is a stationary series of stops comprising a series of pins mounted in the member 47 forming the end or bottom of the casing 46 for movement transverse thereto toward and from the disk 48. One of these last-named pins, namely, the pin 57 lying beneath the cam 50, is normally elevated or projected toward the stops of the movable series by means of a spring 58 and is therefore in a position to prevent rotation of the disk 48 and shaft 40 by engagement with the pin 49 lying beneath said cam. The remaining stops or pins 59 are normally withdrawn away from the disk 48 by springs 60. Pivoted at 61 to the exterior of the casing 46 is a forked lever 62, provided between the arms of its bifurcated end with an operating bar 63. The opposite end of the lever 62 is connected to a link 64 secured at one end to the stop pin 57 and at the other to an arm 65 on the rock shaft 56, said rock shaft being provided with another arm 66 connected by a spring 67 with the bracket 27.

For operating the escapement mechanism above described there is provided a plurality of operating arms 68 fulcrumed on a shaft 69 journaled in the bracket 27. One end of each of the arms 68 is preferably provided with means, hereinafter more fully described, for connection with one of the levers 22 operated by the numeral keys of a typewriter. Each of the arms 68, at its opposite end, engages directly with one of the stop pins 59 and is also at that end connected, by means hereinafter more fully described, with the universal operating bar 63.

The operation of the parts thus far described is as follows: The operator may manipulate the letter or numeral keys or space bar in the usual manner until the carriage 21 is brought to the point at which the master gear 33 is in engagement with one of the gears 32 of the totalizer. In type-writing machines having a tabular key the carriage may, if desired, be brought directly to this point as will be understood by those skilled in the art. Suppose now that one of the numeral keys of the typewriter be depressed, for example, the "4" key. The arm 68 connected with this key will cause the stop pin 59 engaging therewith to be projected toward the disk 48, and will raise the operating bar 63. The bar 63, acting through the lever 62, link 64, and rock shaft 56, will operate to depress the pin lifter 51 and also to depress or withdraw the stop 57. The stop 49 which up to this time has been in engagement with said stop 57 will thereby be released, and the shaft 40 under the influence of the motor 41 be allowed to rotate until said stop 49 is brought into engagement with the stop 59 which has just been elevated by the arm 68. The arrangement is such that the shaft 40 is allowed to make a fraction of a rotation corresponding to the numeral key which has been depressed and therefore the stop 59 which has been elevated. In the construction shown, when the "4" key is depressed the shaft 40 is permitted to make four tenths of a rotation. The master gear 33, and the number wheel 31 with which it is at that time operatively connected through the gear 32, will also make four tenths of a rotation, and, if the number wheels were all initially set at zero, the numeral "4" will be indicated by the number wheel in question.

During the partial rotation of the disk 48 above described, each of the pins 49 as it passed beneath the cam 50, has been depressed thereby into the position shown at the right in Fig. 3. Upon the release of the key therefore, and the consequent withdrawal of the corresponding pin 59, the disk 48 and shaft 40 will not complete their rotation but will be held stationary by the pin 57, which is simultaneously projected upwardly and engaged with the adjacent pin or stop 49. At the same time the pin lifter 51 is raised by the spring 67 acting through the arm 66, rock shaft 56 and yoke 55, and causes the withdrawal of all of the previously depressed pins 49 with the exception of that one beneath the cam 50 and consequently in engagement with the pin 57, which pin 49 is opposite the notch 54 in the pin lifter flange 53. Simultaneously with the release of the key lever the carriage is moved forward one step and the master gear 33 brought into engagement with the adjacent totalizer gear 32. Upon the depression of the same or another numeral key, another numeral will, in the manner above described, appear on the totalizer. In this manner, upon the completion of the line, the numbers written by the type-writing mechanism will be indicated upon the totalizer. As will now be apparent, when another line of numbers is written immediately beneath those above referred to, the registering mechanism will be further operated in accordance with the numbers written, and the sum of the two lines will be indicated by the totalizer. This operation may be continued in accordance with the requirements of the work.

The general structure, arrangement, and coöperation of the various essential parts of the machine having been thus outlined, the preferred construction of certain of these parts, as shown in the drawings, will now be described more in detail.

Referring first to the totalizer 30, this device, in the construction shown, comprises a casing containing two parallel shafts 70 and 71 upon which are rotatably mounted the number wheels 31 and the gears 32, respectively. From the operation of the machine above described it will be evident that the successive operation of the number wheels 31 depends upon the successive engagement of the gears 32 with the master gear 33 in the step by step movement of the carriage 21. It therefore follows that the space, longitudinally of the carriage, occupied by the gears 32 and number wheels 31 cannot be greater than the distance traveled by the carriage at each step. This distance in most typewriters is usually about $\frac{1}{10}$ of an inch. The maximum thickness of the number wheels 31 cannot therefore be greater than $\frac{1}{10}$ inch. If this thickness were diminished by the interposition between said number wheels of transfer or operating gears the index numerals upon their peripheries would be too small to be conveniently observed. To overcome this difficulty, by permitting the number wheels to be placed with their lateral faces substantially in contact, thereby utilizing the full width or thickness of the wheels for the numerals, and also for the purpose of making the totalizer as compact and light as possible, the peripheries of the indicator wheels are preferably provided with notches 73 intermediate the index numerals for the engagement of the teeth on the gears 32.

For preventing the over throw of the number wheels and for rendering the apparatus reliable in operation, there is preferably provided a series of spring-pressed levers 74 carrying rollers 75 adapted to enter the notches 73. For a similar purpose there is provided what, for convenience, will be termed a retarding roller 76 carried between arms 77 on a rock shaft 78 and held normally in engagement with the gears 32 by a light spring 79 connected with a third arm 80 on said rock shaft 78. The roller 76 also serves as a lock for holding the parts of the totalizer against movement when said totalizer is detached from the machine, as hereinafter described.

The bar 29 is preferably formed as a graduated scale upon which one or more totalizers 30 may be detachably and adjustably held in accordance with the requirements of the work, it being obvious that the portion of the movement of the carriage 21 during which the totalizer will be actuated by the master gear 33, and the consequent position on the page of the column of figures to be added, will depend, if the position of the master gear be fixed, upon the position of the totalizer on the carriage. It will also be obvious that, if desired, a plurality of totalizers may be arranged at suitable points along the bar 29 to be successively actuated by the master gear during the travel of the carriage, thereby enabling the operator to write and add a plurality of columns of figures on a single page at one operation. For securing the totalizer upon the bar 29 each of these totalizers (only one of which is shown in the drawings) is preferably provided with a pair of inturned lips or flanges 81 and 82 adapted to embrace said bar, whereby said totalizers may be slipped on or off over the end of said bar and slid therealong to the desired position, in which they may be secured by pivoted latches 83 adapted to engage in notches 84 formed on said bar.

Pivoted within the totalizer casing and backed by a spring 85 is a lever 86 adapted to be operated by a pin or member 87. When the totalizer is slipped into position on the bar 29 said member 87 is forced inwardly by engagement with an inclined notch 88 (see Fig. 1) formed in the end of said bar, and by engagement with the face of the bar said member and the lever 86 are held in the position shown in Fig. 10. Upon removal of the totalizer, however, the spring 85 forces the lever 86 against the arm 80, thereby forcing the roller 76 into close engagement with the gears 32 and locking the same against movement. As a simple but effective form of transfer mechanism each of the gears 32 is provided with one tooth 95 broader than the other teeth and adapted to engage the notches 73 of the number wheel 31 adjacent to the one normally operated by said other teeth. By this arrangement when one of the number wheels is turned from 9 to 0, or vice versa, the adjacent number wheel of the higher order will be turned one number.

In order to provide for the introduction of decimal points or other punctuation marks or symbols, certain of the number wheels 31, together with their corresponding gears 32, may, if desired, be spaced apart a distance equal to one step of the carriage 21, as indicated at 96 in Figs. 9 and 11. The carrying teeth 95 on gears 32 connecting number wheels separated by spaces 96 are preferably formed on separate disks connected with the gears proper by hub portions bridging said spaces, as clearly shown in Fig. 11.

Where a single totalizer is used it is desirable that it be so located on the bar 29 as not to be hidden by the paper in the carriage 21. As above pointed out, however, the position transversely of the page upon which the numbers indicated are printed depends upon the position of the totalizer. If, therefore, a column of figures is to be printed at some distance from the edge of the page, the totalizer would have to be moved along the bar 29 away from the end thereof and be hidden by the paper. In order to overcome this difficulty, and for the further purpose of providing for a more universal adjustability, means are preferably provided for adjusting the master gear 33 relative to the frame 20 in a direction parallel to the direction of movement of the carriage. To this end in the construction shown the master gear is operatively connected with the shaft 34 by an elongated groove or spline 89 and is movable longitudinally of said shaft by a pair of arms 90 carried by a slide 91 movable along a bar 92, said slide being secured in adjusted position by a latch 93 adapted to be engaged with any one of a series of notches 94 in said bar 92. When two lines of figures are written by the typewriting mechanism, one below the other, and the registering mechanism simultaneously actuated, it will be obvious that the final result indicated by the totalizer will be the sum or the difference of the amounts so written, depending upon whether said registering mechanism is actuated in the same or in opposite directions at the time the two amounts are written.

In order to adapt the machine for subtraction as well as addition, and for other purposes as will hereinafter appear, the following mechanism is provided: As above described the actuating shaft 40 is provided with a gear 39 meshing with gears 37 and 38 carried by the shaft 34. Said gears 37 and 38 are loose on said shaft and are adapted to be alternatively clutched thereto by a hub 97 movable longitudinally of said shaft by means of a lever 98. Said lever is connected by a link 99 with a subtraction key shown in the form of a lever 100 pivoted on the pivot screw 29 and guided and held by the bracket 26. In addition to serving as a means for adjusting the mechanism for addition or subtraction the subtraction key 100 may also be used for the purpose of simultaneously checking the operator's work and resetting the totalizer to zero. For example, after a column of figures whose sum is desired has been written, the key 100 being in addition position, and this sum read on the totalizer, the key 100 is moved to subtraction position and the sum written. The operation of writing this sum should thereupon result in setting all of the number wheels of the totalizer to zero. If this is not done the operator will know that an error has been made either in reading or in writing the result.

In order to facilitate the assembling and disassembling of the machine, the actuating shaft 40 is preferably made in two parts comprising an actuating portion or shaft proper 101 and a motor shaft or portion 102. These two portions are axially alined and are detachably connected by suitable coöperating clutch faces 103. The two portions of the shaft 40 are preferably inclosed within a sleeve or bushing 104 passing centrally through the rotating member of the motor 41.

In order to prevent the stop pins 49 from being withdrawn too far by the lifter 51 or in any other manner, means are preferably provided for limiting the movement of these stops relative to the disk 48 away from the coöperating stops 57 and 59, such means as herein shown comprising a stationary collar 105 secured within the casing 46 adjacent the disk 48 and in a position to engage the heads of the pins 49 when the latter are retracted. Means are also preferably provided for limiting the movement of the pins or stops 59, said means as herein shown comprising a plate 106 secured to the bottom of the casing and having its edge located in elongated notches 107 formed in the pins 59, thereby limiting movement of said pins toward and away from the disk 53.

For the purpose of adjusting the normal pressure between the friction flanges 43 and 44, as also for the purpose of adjusting the relative position of the movable and stationary stop carrying members 48 and 47 toward and away from one another, means are preferably provided for adjusting the longitudinal position of the shaft 40, said means comprising an adjusting screw 108 in threaded engagement with the end of the escapement casing 46 and constituting a thrust bearing for the shaft 40. For adjustably connecting the operating arms 68 with the operating bar 63, each of said arms is preferably provided with an adjusting screw 109 having a bearing against said bar.

In order to enable the operator to render the computing mechanism operative or inoperative at will, the shaft 69 is preferably provided with an eccentric portion 110, upon which the operating arms are fulcrumed, and, at its end, with a suitable handle 111, whereby when said handle is turned the operating arms 68 may all be simultaneously lowered and their inner ends with their screws 109 moved out of engagement with the stop pins 59 and with the operating bar 63 respectively.

Means are preferably provided for detachably and adjustably connecting the operating arms 68 with the numeral key levers 22 of a typewriter, such means as herein shown comprising stirrups 112 carried by said operating arms and adapted to be slipped over said key levers, and adjusting screws 113 also carried by said arms and adapted to engage said levers. While the stirrups 112 embrace the key levers they are otherwise disconnected therefrom, so that the operating arms may be readily slipped into place in any typewriter, and may equally easily be removed without the necessity of removing or loosening any screws, rivets, straps, or other attaching means. The operating arms lie in the path of movement of the key levers and are engaged thereby when said levers are operated, the stirrups 112 constituting a form of lost motion connection between the arms and levers, the amount of lost motion being adjustable by means of the screws 113.

The construction described provides a wide range of adaptability, whereby the computing mechanism may be quickly and easily applied to any typewriter without the necessity of careful and accurate workmanship in making the connecting parts of the proper dimensions and proportions.

While the invention is herein shown as constructed in a form adapted for attachment to a typewriter of usual form, it will be obvious to those skilled in the art that with slight modification of the construction shown the computing mechanism might be embodied in a machine independent of such typewriting machine.

Having thus described my invention I claim and desire to secure by Letters Patent:

1. In a computing machine, an escapement mechanism comprising, in combination, a relatively movable series of stops, a second relatively stationary series of stops, the individual stops of said last-named series being movable toward and from said first-named series, and means for limiting the movement of the stops of said last-named series toward said first named series.

2. In a computing machine, as escapement mechanism comprising, in combination, a relatively movable series of stops, a second relatively stationary series of stops, the individual stops of said last-named series being movable toward and from said first-named series, and means for limiting the movement of the stops of said last-named series away from said first named series.

3. In a computing machine, an escapement mechanism comprising, in combination, a relatively movable series of stops, a second relatively stationary series of stops, the individual stops of said last-named series being movable toward and from said first-named series, and means for limiting the movement of the stops of said last-named series in both directions toward and from said first-named series.

4. In a computing machine, an escapement mechanism comprising, in combination, a casing, a rotary disk in said casing, provided with a series of stops, a second series of stops mounted in the end of said casing for movement toward and from said disk, said last-named stops being provided with elongated notches, and a plate secured to the end of said casing and having its edge located in said notches.

5. In a computing machine, an escapement mechanism comprising, in combination, a relatively movable series of stops, a second relatively stationary series of stops, the individual stops of each of said series being movable toward and from the other of said series, means for limiting the movement of the stops of said movable series away from said stationary series, and means for limiting the movement of the stops of said stationary series.

6. In a computing machine, the combination with a totalizer and operating mechanism for said totalizer, of a continuously running motor having a rotating member provided with a friction flange, a second friction flange operatively connected with said operating mechanism and located adjacent said first-named friction flange, and an escapement mechanism intermediate said motor and operating mechanism for controlling the operation of said operating mechanism by said motor.

7. In a computing machine, the combination with registering mechanism, of a continuously running motor having a rotating member provided with a friction flange, a shaft operatively connected with said registering mechanism, a second friction flange carried by said shaft and located adjacent said first-named friction flange, and means for adjusting said shaft longitudinally to adjust the relative position of said friction flanges.

8. In a computing machine, the combination with a motor having a rotating part provided with a clutch member, of registering mechanism, a shaft for actuating said mechanism, a clutch member carried by said shaft, and a screw for adjusting the longitudinal position of said shaft.

9. In a computing machine, an escapement mechanism, comprising, in combination, a movable member carrying a stop, a stationary member provided with a coöperating stop, and means for adjusting the relative position of said members toward and from one another.

10. In a computing machine, an escapement mechanism comprising, in combination, a stationary member provided with a series of stops, a shaft journaled in said member, a disk mounted on said shaft and carrying a series of coöperating stops, and a screw for adjusting the longitudinal position of said shaft.

11. In a computing machine, an escapement mechanism comprising, in combination, a movable member carrying a stop movable transversely thereof, means for engaging said stop for limiting the movement thereof relative to said member, a stationary member provided with a coöperating stop, and means for adjusting the relative position of said members toward and from one another.

12. In a computing machine, an escapement mechanism comprising, in combination, a movable member carrying a stop, a stationary member provided with a stop movable toward and from said movable member, means for limiting the movement of said last named stop, and means for adjusting the relative position of said members toward and from one another.

13. In a computing machine, the combination with a motor and a clutch member carried thereby, of registering mechanism including a coöperating clutch member, an escapement mechanism comprising a movable member carrying a stop and a stationary member provided with a coöperating stop, and means for adjusting the relative positions of said clutch members and said escapement members.

14. A computing machine comprising, in combination, registering mechanism, a directly connected driving shaft therefor, escapement mechanism controlling said shaft, and a motor mounted on and operatively connected with said shaft.

15. A computing machine comprising, in combination, registering mechanism, escapement mechanism, a shaft connecting said registering and escapement mechanisms, and a motor having a rotating member mounted on said shaft between said mechanisms.

16. A computing machine comprising, in combination, registering mechanism, a shaft for actuating said mechanism, a continuously running motor mounted on said shaft, means for operatively connecting said shaft and motor, and escapement mechanism mounted on said shaft for controlling the operation of said registering mechanism by said motor.

17. A computing machine comprising, in combination, registering mechanism, a shaft for actuating said mechanism, a clutch member carried by said shaft, a motor mounted on said shaft, a coöperating clutch member driven by said motor, and means for adjusting the relative position of said clutch members.

18. In a computing machine, in combination, registering mechanism, an actuating shaft therefor, a motor, a motor shaft alined with and detachably connected to said actuating shaft, and an escapement mechanism mounted on said motor shaft.

19. In a computing machine, in combination, registering mechanism, an actuating shaft therefor, a motor, a motor shaft alined with and detachably connected to said actuating shaft, an escapement mechanism mounted on said motor shaft, and coöperating clutch members carried by said motor and motor shaft respectively.

20. In a computing machine, in combination, registering mechanism, mechanism for actuating and controlling the same, a plurality of arms for operating said last-named mechanism, stirrups carried by said arms and adapted to embrace the key levers of a typewriter, and adjusting screws carried by said arms and adapted to engage said key levers.

21. In a computing machine, in combination, registering mechanism, an escapement mechanism for controlling the same, a bracket adapted for attachment to a typewriter frame by which said escapement mechanism is carried, a universal operating bar for said escapement, and means also carried by said bracket for adjustably connecting said bar with the key levers of said typewriter.

22. In a computing machine, in combination, registering mechanism, an escapement mechanism for controlling the same, a bracket by which said escapement mechanism is carried, an operating bar for said escapement, a plurality of operating arms also carried by said bracket, and means for adjustably connecting said arms and bar.

23. In a computing machine, in combination, registering mechanism, an escapement mechanism for controlling the same, a bracket by which said escapement mechanism is carried, an operating bar for said escapement, a plurality of operating arms also carried by said bracket, and adjusting screws carried by said arms and engaging said bar.

24. In a computing machine, in combination, registering mechanism, an escapement mechanism for controlling the same, said escapement mechanism including a member provided with a stop movable transversely thereof and means for engaging said stop for limiting the movement thereof relative to said member, a bracket adapted for attachment to a typewriter frame by which said escapement is carried, means for operating said escapement, and means also carried by said bracket for adjustably connecting said operating means with the key levers of said typewriter.

25. In a computing mechanism, the combination with registering mechanism and an escapement mechanism therefor comprising a movable member carrying a stop, a stationary member provided with a coöperating stop, and means for adjusting the relative position of said members toward and from one another, of means for operating said escapement and means for adjustably connecting said operating means with the key levers of a typewriter.

26. In a computing machine, in combination, registering mechanism, an escapement mechanism for controlling the same and comprising a relatively movable series of stops, a second relatively stationary series of stops, the individual stops of said last named series being movable toward and from said first-named series, and a plurality of arms for operating the stops of said last-named series, said arms being in direct engagement with said stops.

27. In a computing machine, in combination, registering mechanism, an escapement mechanism for controlling the same and comprising a movable member carrying a stop and a stationary member provided with a coöperating stop movable into and out of operative position, means for adjusting the relative position of said members toward and from one another, and an arm in direct engagement with said last-named stop for operating the same.

28. In a computing mechanism, in combination, registering mechanism, an escapement mechanism for controlling the same and including a stop pin movable into and out of operative position, an arm in direct engagement with said stop for operating the same, and means for adjustably connecting said arm with the key lever of a typewriter.

29. In a computing machine, in combination, registering mechanism, mechanism for actuating and controlling the same, means for operatively connecting said last-named mechanism with the key levers of a typewriter, and means independent of its engagement with said key levers for rendering said connecting means operative and inoperative.

30. In a computing machine, in combination, registering mechanism, mechanism for actuating and controlling the same, a plurality of levers for operating said last-named mechanism, and a rotatable shaft having an eccentric portion on which said levers are fulcrumed.

31. The combination with a frame and a carriage movable relatively thereto, of registering mechanism comprising a totalizer mounted on said carriage, and means on said frame for operating said totalizer when brought into engagement therewith, said last-named means being adjustable on said frame in a direction parallel to the direction of movement of said carriage.

32. The combination with a frame and a carriage movable relatively thereto, of registering mechanism comprising a totalizer mounted on said carriage and having a series of gears, a master gear on said frame and adapted to engage said totalizer gears successively as said carriage is moved, a shaft arranged parallel to the direction of movement of said carriage and on which said master gear is mounted for rotation therewith, and means for adjusting said master gear longitudinally of said shaft.

33. The combination with a frame and a carriage movable relative thereto, of registering mechanism comprising a totalizer mounted on said carriage and adjustable thereon in a direction parallel to the direction of movement thereof, and means on said frame for operating said totalizer when brought into engagement therewith, said last-named means being adjustable on said frame in a direction parallel to the direction of movement of said carriage.

34. In a computing machine, a detachable totalizer provided with means for locking the same as a whole in position in said machine and with separate means for automatically locking the movable parts of said totalizer against movement when said totalizer is detached from said machine.

35. In a computing machine, in combination, a support, a totalizer adapted to be detachably secured to said support and means for locking said totalizer to said support, said totalizer being provided with normally operative means for locking the movable parts thereof against movement and with means separate from said first named locking means adapted to engage said support when said totalizer is secured thereto for holding said last-named locking means inoperative.

36. In a computing machine, the combination with a detachable totalizer comprising a gear, a lock adapted to enter between the teeth of said gear, a spring-pressed lever for normally pressing said lock into close engagement with said gear for locking the same, and means adapted to engage a portion of said machine when said totalizer is in place therein for withdrawing said lever, of means separate from said last-named means for locking said totalizer in position in said machine.

37. In a computing machine, a totalizer comprising a gear, a retarding roller, a light spring for holding said roller in engagement with said gear, and additional means for forcing said roller into close engagement with said gear for locking the same.

38. In a computing machine, in combination, registering mechanism, mechanism for actuating and controlling the same, an operating arm for said last-named mechanism, a key lever, and means carried by said operating arm for loosely embracing said key lever.

39. In a computing machine, in combination, a key lever, registering mechanism, mechanism for actuating and controlling the same, an operating arm for said last-named mechanism having a portion arranged adjacent said key lever for engagement thereby and providing a lost motion connection between said key lever and operating arm, and means for adjusting the amount of said lost motion.

40. In a computing machine, the combination with registering mechanism, of an actuating shaft for said mechanism, a continuously running motor having a rotating member provided with a friction flange, a motor shaft alined with and detachably connected to said actuating shaft, a second friction flange carried by said motor shaft and located adjacent said first-named friction flange, means for adjusting said motor shaft longitudinally to adjust the relative position of said friction flanges, and an escapement mechanism mounted on said motor shaft.

41. In a computing machine, the combination with a totalizer and operating mechanism for said totalizer, of an actuating shaft for said operating mechanism, a continuously running actuator, a second shaft driven by said actuator and alined with and detachably connected to said first-named shaft, and an escapement mechanism mounted on said last-named shaft.

42. In a computing machine, in combination, registering mechanism, an escapement mechanism for controlling the same and comprising a plurality of stop pins movable into and out of operative position, a plurality of arms for operating said stop pins, said arms being in direct engagement with said pins, a series of key levers, and direct lost motion connections between said key levers and operating arms.

43. A computing attachment for typewriters comprising, in combination, a totalizer adapted for attachment to the typewriter carriage, a bracket adapted for attachment to the typewriter frame, and mechanism carried by said bracket for operating and controlling said totalizer, said mechanism including a series of operating arms provided with means for direct adjustable connection with the typewriter key levers.

44. A computing attachment for typewriters comprising, in combination, a totalizer adapted for attachment to the typewriter carriage, a bracket adapted for attachment to the typewriter frame, and mechanism carried by said bracket for operating and controlling said totalizer, said mechanism including a continuously running motor and a series of operating arms provided with means for direct adjustable connection with the typewriter key levers.

45. A computing attachment for typewriters comprising, in combination, a totalizer adapted for attachment to the typewriter carriage, a bracket adapted for attachment to the typewriter frame, and mechanism carried by said bracket for operating and controlling said totalizer, said mechanism including a series of operating arms provided with means for direct adjustable connection with the typewriter key levers, and means independent of said last-named means for rendering said operating arms operative and inoperative.

In testimony whereof I affix my signature, in presence of two witnesses.

AUGUSTUS G. SNYDER.

Witnesses:
CHAS. S. HYER,
C. M. SWEENEY.

Copies of this patent may be obtained for five cents each, by addressing the "Commissioner of Patents, Washington, D. C."